(12) United States Patent
Yang et al.

(10) Patent No.: US 8,128,161 B2
(45) Date of Patent: Mar. 6, 2012

(54) INTERIOR BODY TRIM WITH INTEGRATED HVAC DUCT

(75) Inventors: Thomas Yang, Novi, MI (US); Tomohito Hashikawa, West Bloomfield, MI (US)

(73) Assignee: Nissan North America, Inc., Franklin, TN (US)

( * ) Notice: Subject to any disclaimer, the term of this patent is extended or adjusted under 35 U.S.C. 154(b) by 162 days.

(21) Appl. No.: 12/567,062

(22) Filed: Sep. 25, 2009

(65) Prior Publication Data

US 2011/0074184 A1    Mar. 31, 2011

(51) Int. Cl.
*B60K 37/00* (2006.01)
(52) U.S. Cl. ........................................................ 296/208
(58) Field of Classification Search .................. 296/208, 296/187.05, 191, 190.09, 193.06
See application file for complete search history.

(56) References Cited

U.S. PATENT DOCUMENTS

| | | | | |
|---|---|---|---|---|
| 1,618,152 A * | 2/1927 | Hutchins | ........................ | 454/138 |
| 1,956,123 A * | 4/1934 | Givens | ........................ | 454/142 |
| 2,162,152 A * | 6/1939 | Wulle | ........................ | 165/60 |
| 2,696,774 A * | 12/1954 | Bayley | ........................ | 454/120 |
| 3,343,473 A * | 9/1967 | Gillick et al. | ........................ | 454/99 |
| 3,520,355 A * | 7/1970 | Rueth | ........................ | 165/42 |
| 4,022,599 A * | 5/1977 | Wilson et al. | ........................ | 62/244 |
| 4,173,174 A * | 11/1979 | Vinko et al. | ........................ | 454/152 |
| 4,229,036 A * | 10/1980 | Toda | ........................ | 296/202 |
| 4,252,053 A * | 2/1981 | Muto et al. | ........................ | 454/137 |
| 4,691,623 A * | 9/1987 | Mizusawa | ........................ | 454/164 |
| 4,834,170 A * | 5/1989 | Sakurada et al. | ........................ | 165/43 |
| 4,874,036 A * | 10/1989 | Masuda | ........................ | 165/42 |
| 5,003,866 A * | 4/1991 | Ricci | ........................ | 454/146 |
| 5,010,742 A * | 4/1991 | Bolton et al. | ........................ | 62/262 |
| 5,261,856 A * | 11/1993 | Walser | ........................ | 454/139 |
| 5,307,645 A * | 5/1994 | Pannell | ........................ | 62/244 |
| 5,544,933 A * | 8/1996 | Shahab et al. | ........................ | 296/187.05 |
| 5,583,301 A * | 12/1996 | Strauss et al. | ........................ | 73/861.29 |
| 5,591,078 A * | 1/1997 | Filion et al. | ........................ | 454/124 |
| 5,609,385 A * | 3/1997 | Daniel et al. | ........................ | 296/187.05 |
| 5,709,601 A * | 1/1998 | Heck | ........................ | 454/121 |
| 5,720,510 A * | 2/1998 | Daniel et al. | ........................ | 296/187.05 |
| 5,725,271 A * | 3/1998 | Patel et al. | ........................ | 296/187.05 |
| 5,741,179 A * | 4/1998 | Sun et al. | ........................ | 454/155 |
| 5,752,877 A * | 5/1998 | Sun | ........................ | 454/155 |
| 5,884,689 A * | 3/1999 | Takechi et al. | ........................ | 165/43 |
| 6,045,444 A * | 4/2000 | Zima et al. | ........................ | 454/121 |
| 6,048,263 A * | 4/2000 | Uchida et al. | ........................ | 454/121 |
| 6,110,037 A * | 8/2000 | Yoshinaka | ........................ | 454/143 |
| 6,139,423 A * | 10/2000 | Wadey | ........................ | 454/142 |
| 6,296,296 B1 * | 10/2001 | Sekishiro et al. | ........................ | 296/146.7 |
| 6,351,961 B1 * | 3/2002 | Kurokawa et al. | ........................ | 62/244 |
| 6,361,428 B1 * | 3/2002 | Tosconi et al. | ........................ | 454/137 |
| 6,409,590 B1 * | 6/2002 | Suzuki et al. | ........................ | 454/143 |
| 6,453,991 B1 * | 9/2002 | Tsurushima et al. | ........................ | 165/202 |
| 6,520,849 B1 * | 2/2003 | Greenwald et al. | ........................ | 454/121 |
| 6,547,152 B1 * | 4/2003 | Pawlak, III | ........................ | 237/12.3 B |
| 6,554,696 B2 * | 4/2003 | Kowalski et al. | ........................ | 454/155 |
| 6,609,389 B2 * | 8/2003 | Ozeki et al. | ........................ | 62/244 |

(Continued)

*Primary Examiner* — Kiran B Patel
(74) *Attorney, Agent, or Firm* — Global IP Counselors, LLP (57) ABSTRACT

An interior body trim arrangement is basically provided with an interior body trim panel and a back closure member. The interior body trim panel has an interior facing surface and an outboard facing surface opposite the interior facing surface. The back closure member is fixed to the outboard facing surface of the interior body trim panel. The inboard facing surface of the back closure member and the outboard facing surface of the interior body trim panel define an integrated HVAC duct having a first opening end and a second open end.

20 Claims, 12 Drawing Sheets

U.S. PATENT DOCUMENTS

| | | | |
|---|---|---|---|
| 6,616,522 B2* | 9/2003 | Colinet | 454/121 |
| 6,620,039 B1* | 9/2003 | Tao et al. | 454/139 |
| 6,715,814 B1* | 4/2004 | Hoyle | 296/24.36 |
| 6,739,969 B2* | 5/2004 | Shin | 454/155 |
| 6,808,451 B2* | 10/2004 | Luik et al. | 454/155 |
| 6,925,825 B2* | 8/2005 | Nakagawa et al. | 62/244 |
| 6,974,377 B2* | 12/2005 | Gehring et al. | 454/152 |
| 6,991,532 B2* | 1/2006 | Goldsmith | 454/156 |
| 7,021,704 B2* | 4/2006 | Ortega Martinez et al. | 296/214 |
| 7,174,918 B2* | 2/2007 | Stevenson et al. | 137/883 |
| 7,247,088 B2* | 7/2007 | Sogame | 454/124 |
| 7,413,007 B2* | 8/2008 | Yamaoka | 165/202 |
| 7,540,321 B2* | 6/2009 | Simmet et al. | 165/203 |
| 7,621,556 B2* | 11/2009 | Itakura | 280/728.2 |
| 2002/0178744 A1* | 12/2002 | Tanabe et al. | 62/407 |
| 2003/0054750 A1* | 3/2003 | Luik et al. | 454/69 |
| 2004/0259492 A1* | 12/2004 | Suzuki et al. | 454/124 |
| 2007/0123157 A1* | 5/2007 | Shah et al. | 454/121 |
| 2007/0184772 A1* | 8/2007 | McConnell et al. | 454/139 |
| 2007/0222192 A1* | 9/2007 | Yamagiwa et al. | 280/730.2 |
| 2008/0277955 A1* | 11/2008 | Sato | 296/1.08 |
| 2008/0296928 A1* | 12/2008 | Matsuoka et al. | 296/146.7 |
| 2010/0032928 A1* | 2/2010 | Yamanishi et al. | 280/728.3 |

\* cited by examiner

INTERIOR BODY TRIM WITH INTEGRATED HVAC DUCT

BACKGROUND OF THE INVENTION

1. Field of the Invention

The present invention generally relates to a vehicle air duct structure. More specifically, the present invention relates to an interior body trim with an integrated HVAC duct for a vehicle.

2. Background Information

In a conventional vehicle HVAC system, an air duct structure is provided for conveying temperature conditioned air to a passenger compartment. In such air duct structures, typically one or more blow-molded air ducts extend from an air treatment device to a vent that opens to a passenger compartment. Thus, the temperature conditioned air from the air treatment device is conveyed to the passenger compartment through these air ducts. Typically, these air ducts are first attached to the vehicle body or other structure, and then covered by several pieces of interior body trims. In other words, the air ducts and the interior body trims are typically separate pieces that are separately installed. This installation of the air ducts and the interior body trims can be a time consuming process.

SUMMARY OF THE INVENTION

It has been discovered that the installation process of the air ducts and the interior body trims can be reduced by integrating an air duct with the interior body trims. While a stand alone blow molded duct can be used and pre-assembled to a body side trim panel, this arrangement would require all trim clip dog houses to be added via secondary operation. Thus, accurate positioning of the trim clip dog houses can be in such a configuration because a secondary operation was introduced to add trim clip dog houses. Thus, it is desirable to form an integrated HVAC duct in which a portion of the air passage is formed by the interior body trim panel.

In view of the state of the known technology, one object is to provide an interior body trim arrangement in which an interior body trim panel includes an integrated HVAC duct that can be installed as a single unit to the vehicle body.

The foregoing object can basically be attained by providing an interior body trim arrangement that basically comprises an interior body trim panel and a back closure member. The interior body trim panel has an interior facing surface and an outboard facing surface opposite the interior facing surface. The back closure member is fixed to the outboard facing surface of the interior body trim panel. The inboard facing surface of the back closure member and the outboard facing surface of the interior body trim panel define an integrated HVAC duct having a first opening end and a second open end.

The above object and other objects, features, aspects and advantages of the present invention will become apparent to those skilled in the art from the following detailed description, which, taken in conjunction with the annexed drawings, discloses preferred embodiments.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
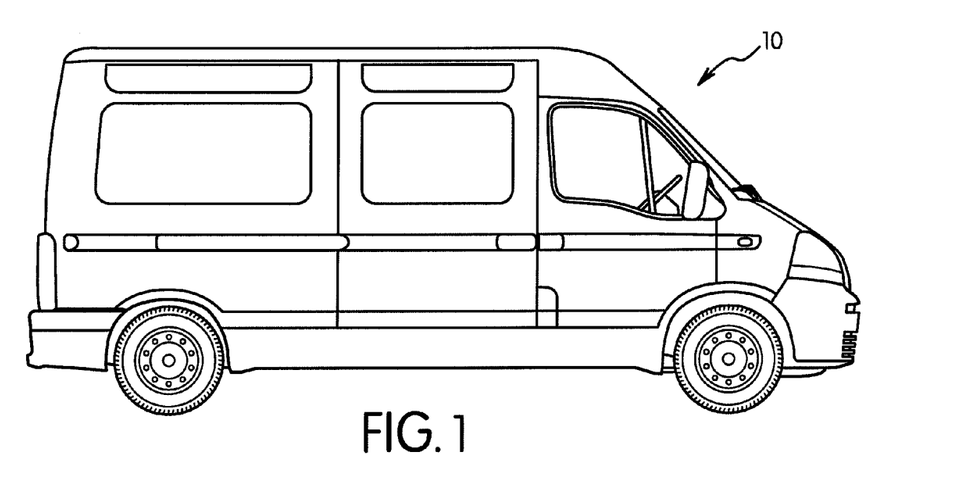
FIG. 1 is a side elevational view of a vehicle which includes an interior body trim arrangement with an integrated HVAC duct in accordance with a first embodiment.
Figure 2:
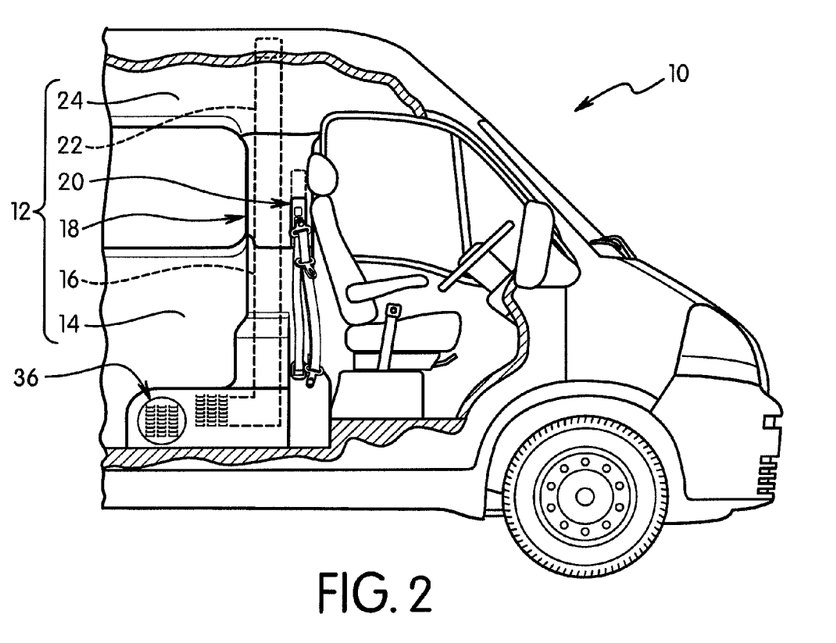
FIG. 2 is a side elevational view of the vehicle illustrated in FIG. 1 with a portion broken away to illustrate the interior body trim arrangement with the integrated HVAC duct in accordance with the first embodiment.
Figure 3:
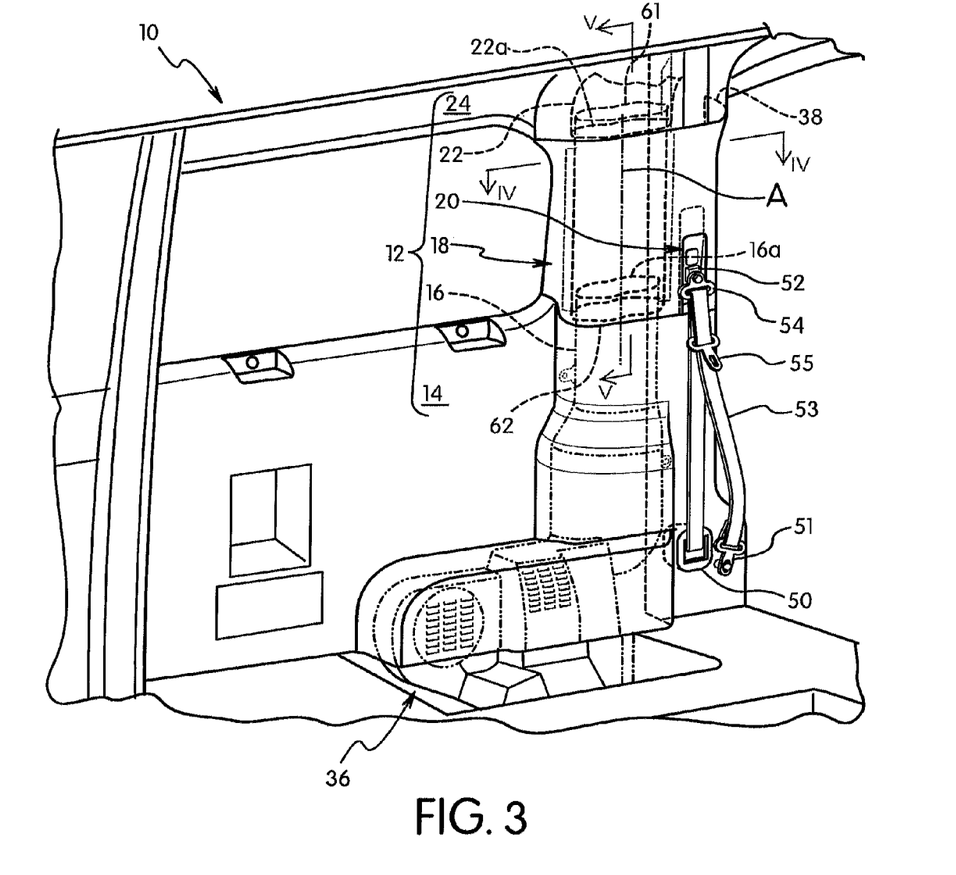
FIG. 3 is a perspective view of an interior portion of the vehicle that includes the interior body trim arrangement with the integrated HVAC duct in accordance with the first embodiment.

Referring initially to FIGS. 1 to 3, a vehicle 10 is illustrated that includes an interior body trim arrangement 12 in accordance with a first embodiment. In this illustrated embodiment, the interior body trim arrangement 12 basically includes a lower sidewall section 14, a lower sidewall duct 16, an upper B-pillar section 18, a seat belt assembly 20, a roof duct 22 and a head liner 24. The precise constructions of the lower sidewall section 14, the lower sidewall duct 16, the seat belt assembly 20, the roof duct 22 and the head liner 24 are not part of the present invention other than their connection to the upper B-pillar section 18. Thus, the lower sidewall section 14, the lower sidewall duct 16, the seat belt assembly 20, the roof duct 22 and the head liner 24 will not be discussed and/or illustrated in detail herein. Rather, these parts 14, 16, 20, 22 and 24 will only be diagrammatically illustrated herein.

Figure 4:
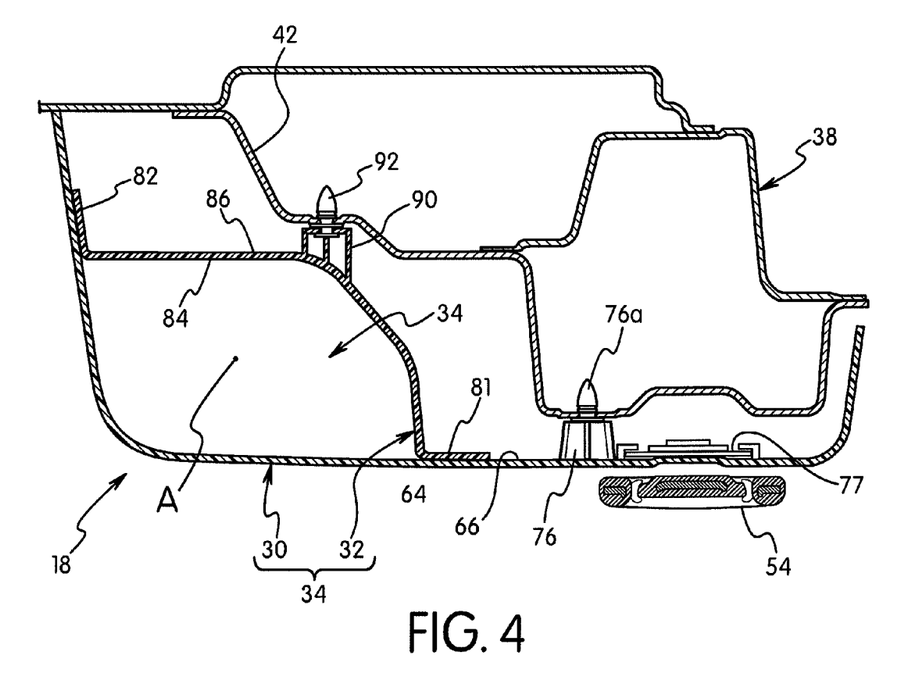
FIG. 4 is a horizontal cross sectional view of the vehicle body and the interior body trim arrangement as viewed along section line 4-4 in FIG. 3 to show the attachment of the integrated HVAC duct to the vehicle body.
Figure 6:
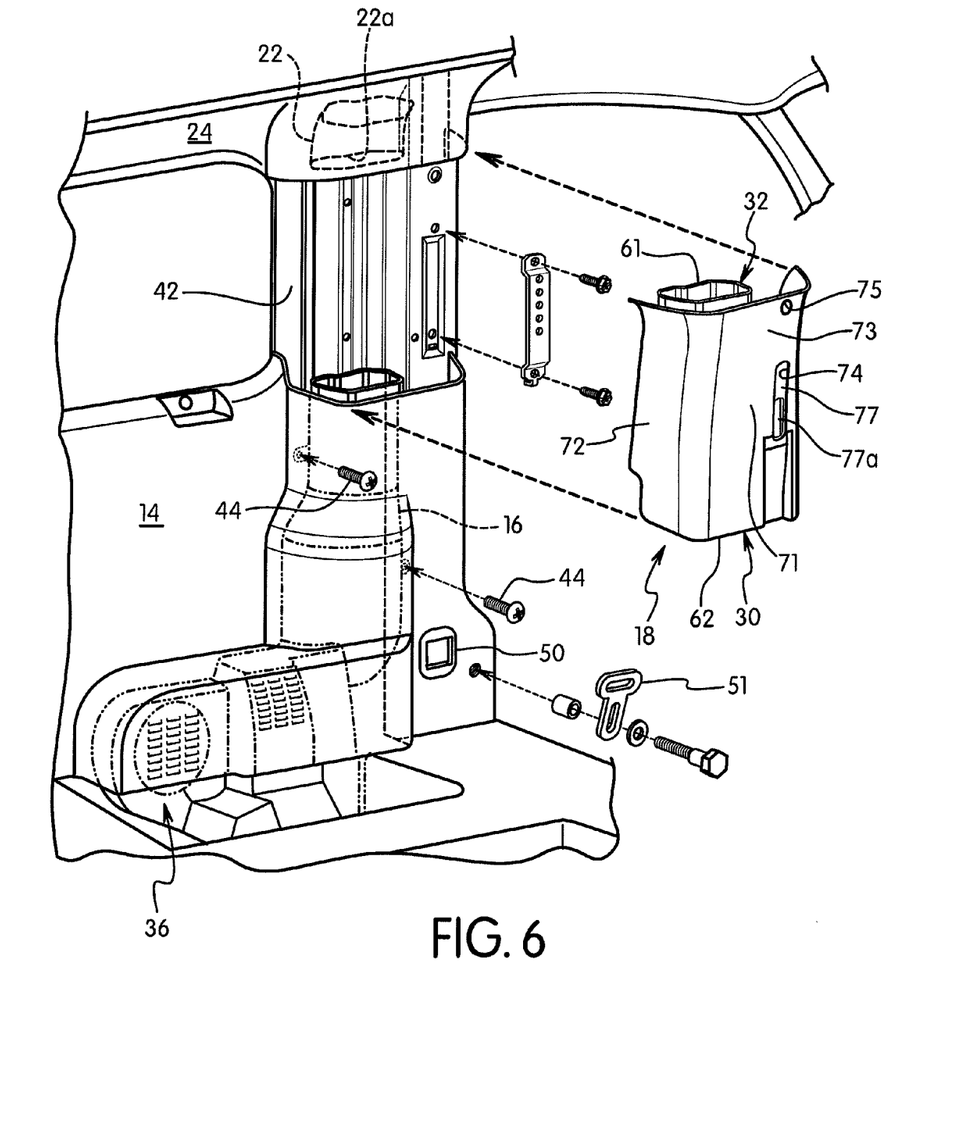
FIG. 6 is a perspective view of the interior portion of the vehicle with the interior body trim arrangement exploded outward from the vehicle body to show an installation process.
Figure 7:
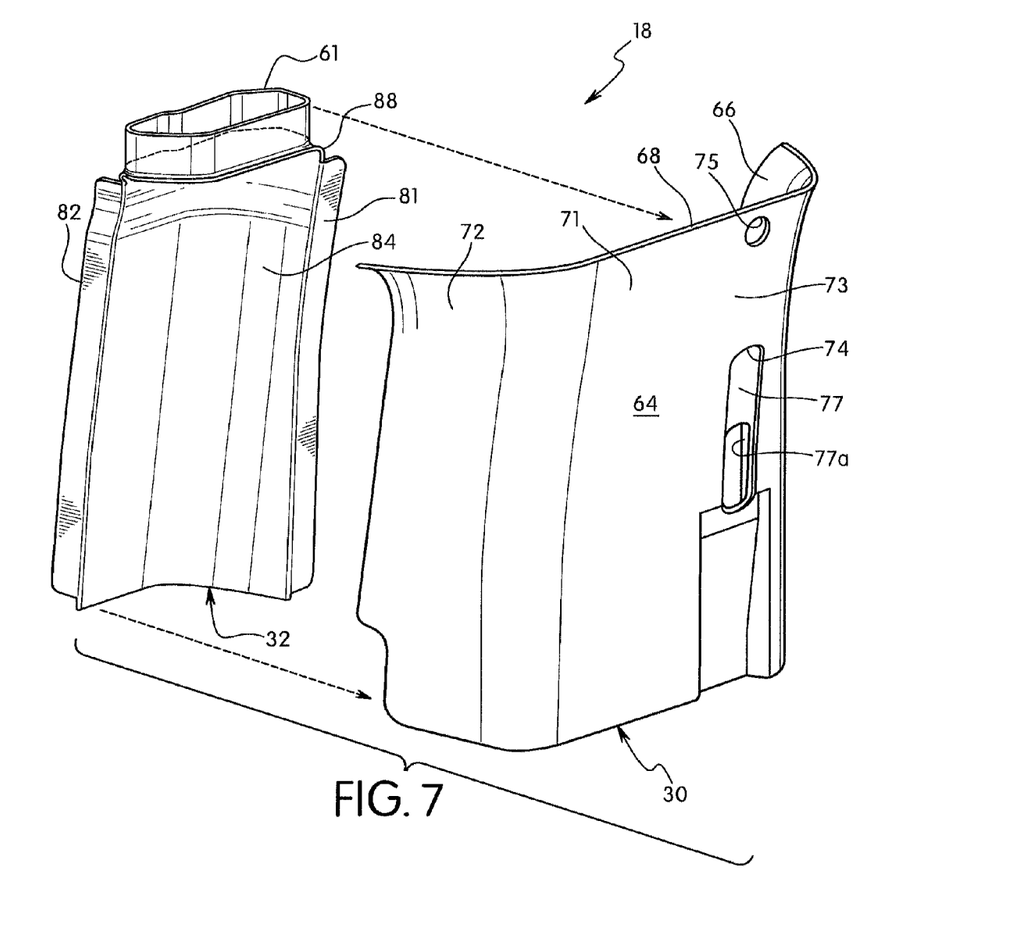
FIG. 7 is an exploded, inboard side perspective view of a portion of the interior body trim arrangement with the integrated HVAC duct illustrated in FIGS. 2 to 6.
Figure 8:
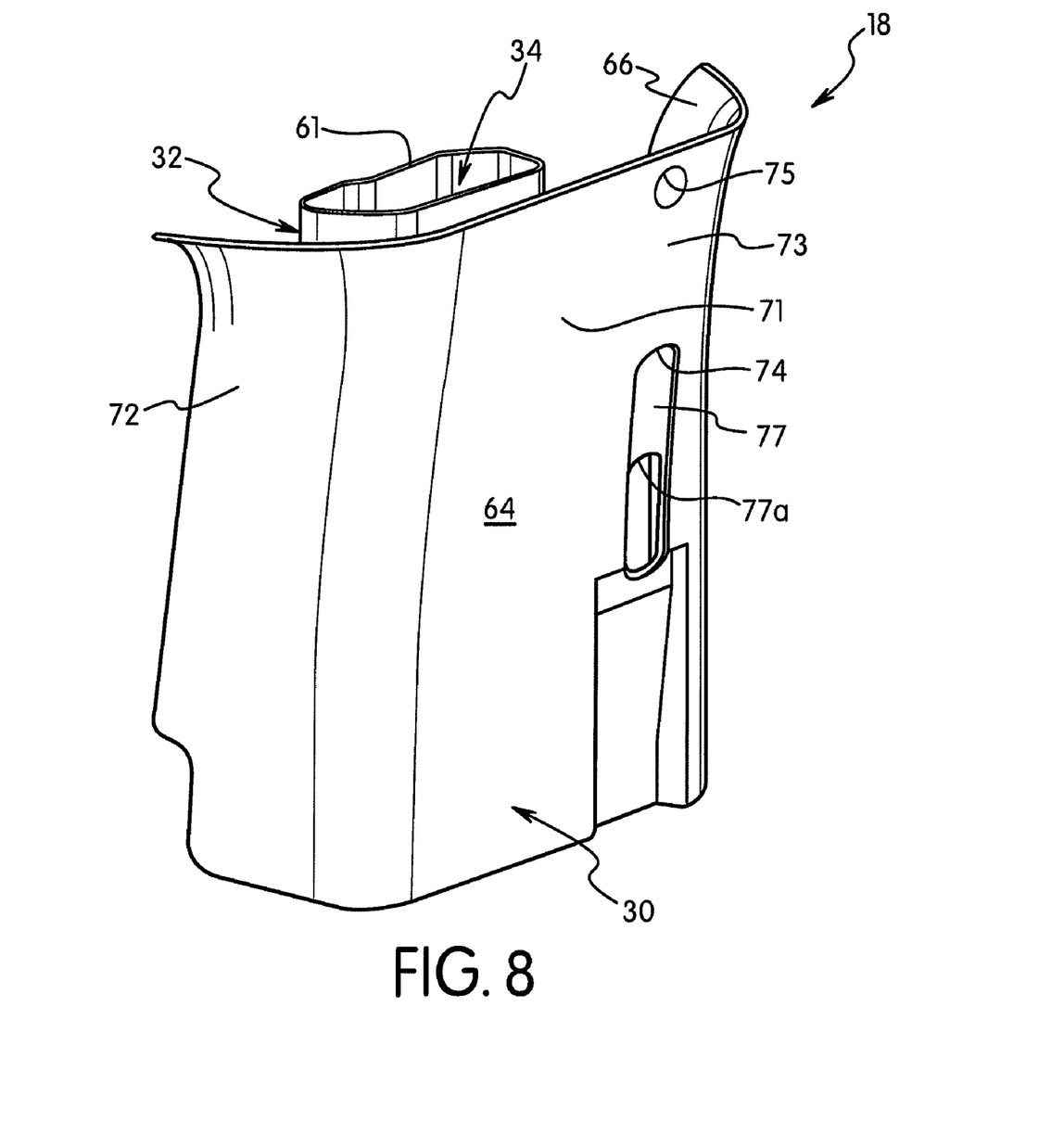
FIG. 8 is an inboard side perspective view of the portion of the interior body trim arrangement with the integrated HVAC duct illustrated in FIGS. 2 to 7.

Basically, as seen in FIGS. 4 and 7, the upper B-pillar section 18 includes an interior body trim panel 30 and a back closure member 32, which together define an integrated HVAC duct 34. As seen in FIGS. 3 and 6, the integrated HVAC duct 34 is disposed between the lower sidewall duct 16 and the roof duct 22 for conveying temperature conditioned air from a heating, ventilating and air conditioning (HVAC) unit 36. The HVAC unit 36 includes conventional components such as a heater core, a blower that blows air through the heater core, an evaporator that cools the air, and the like.

In this illustrated embodiment, the HVAC unit 36 constitutes an air treatment device that is disposed rearward of a driver side B-pillar 38 as seen in FIG. 3. The blower of the HVAC unit 36 forces air through the ductwork (i.e., including, but not limited to, the lower sidewall duct 16, the integrated HVAC duct 34 and the roof duct 22) for supplying temperature conditioned air to the passenger cabin of the vehicle 10. The HVAC unit 36 is configured and arranged to control environmental temperatures of a passenger cabin of the vehicle 10. The HVAC unit 36 preferably has operator controls disposed in an instrument panel of the passenger cabin of the vehicle 10.

As seen in FIGS. 3 and 4, the lower sidewall section 14 is a lower interior body trim panel that is formed of one or more pieces for covering a lower portion of a side body inner panel 42 that is formed of one or more pieces of sheet metal, which also partially forms the driver side B-pillar 38. The lower sidewall section 14 extends over the lower half of the driver side B-pillar 38 and extends rearward of the driver side B-pillar 38. The lower sidewall section 14 is fastened to the side body inner panel 42 by several conventional trim clips (not shown) in a conventional manner. The lower sidewall section 14 also covers the lower sidewall duct 16 and a portion of the HVAC unit 36. Preferably, the lower sidewall section 14 is formed of one or more pieces of a molded plastic material. The lower sidewall section 14 can be a relatively conventional member.

The lower sidewall duct 16 and the roof duct 22 are conventional plastic ducts. The ducts 16 and 22 are preferably each formed as a one-piece, unitary member by a conventional blow molding process or other conventional molding processes. However, the ducts 16 and 22 can be made of any suitable material using any suitable forming process as needed and/or desired. The ducts 16 and 22 are substantially tubular members. The roof duct 22 is provided with a vent register (not shown) that is installed in the head liner 24 of the passenger cabin.

As best seen in FIGS. 3 and 6, the lower sidewall duct 16 is fastened to the side body inner panel 42 by fasteners 44 (e.g., screws), with the lower sidewall section 14 (i.e., the lower interior body trim panel) covering the lower sidewall duct 16. The roof duct 22 is fastened to a roof body inner panel by one or more fasteners (not shown), with the head liner 24 (i.e., a roof interior body trim panel) covering the roof duct 22. The head liner 24 is fastened to a roof body inner panel by several conventional trim clips (not shown) in a conventional manner. The precise configurations of the lower sidewall duct 16 and the roof duct 22 will depend upon the particular configuration of the body of the vehicle 10. Thus, the configurations of the lower sidewall duct 16 and the roof duct 22 will not be discussed in detail herein.

Figure 5:
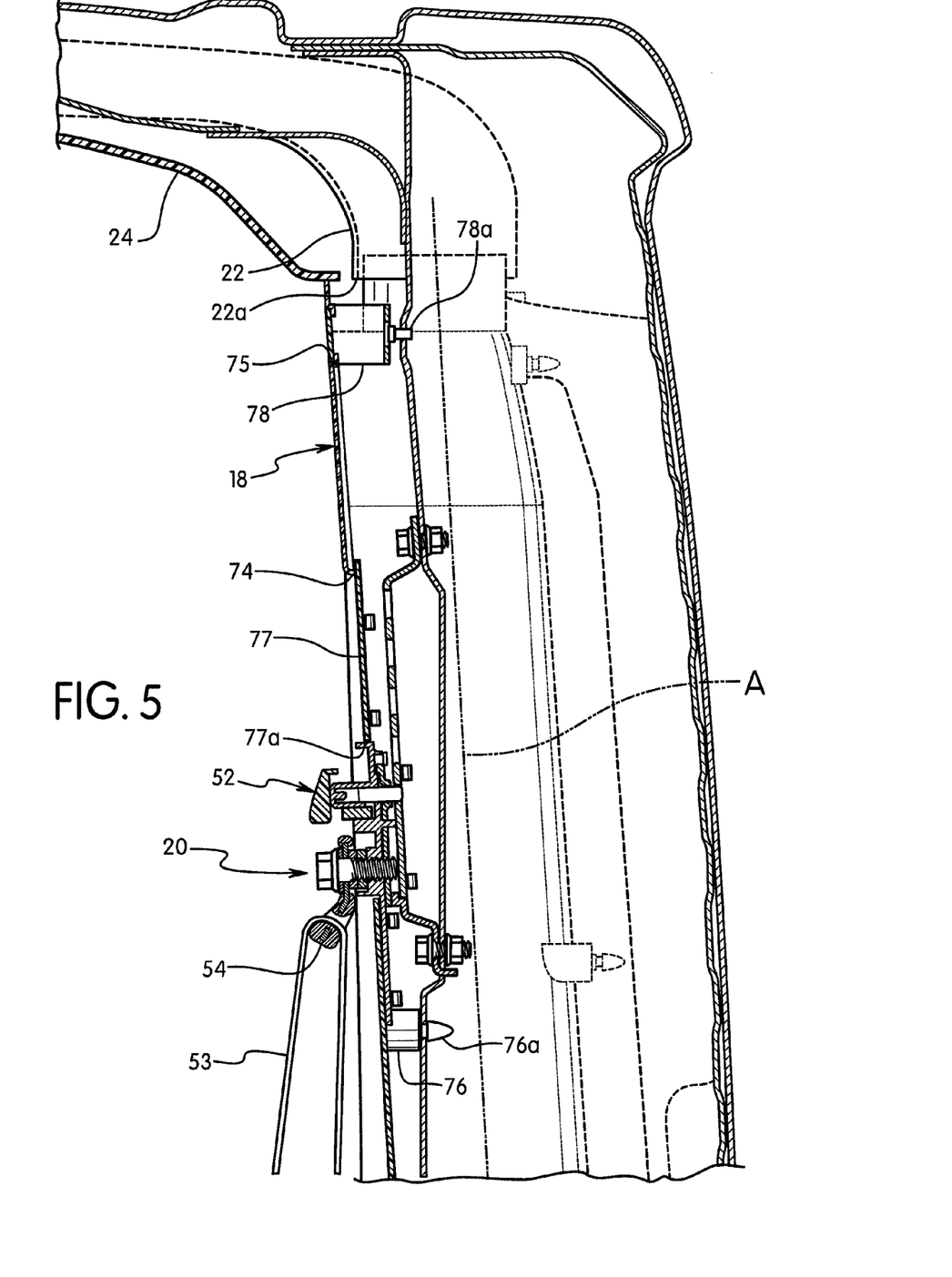
FIG. 5 is a vertical cross sectional view of the vehicle body and the interior body trim arrangement as viewed along section line 5-5 in FIG. 3 to show the attachment of the seat belt assembly to the vehicle body.

As best seen in FIGS. 3 and 5, the seat belt assembly 20 basically includes a retractor unit 50, an anchor 51, a seat belt height adjuster assembly 52, a seat belt webbing 53, a D-ring 54 and a seat belt tongue 55. The retractor unit 50, the anchor 51 and the seat belt height adjuster assembly 52 are all fixed to the side body inner panel 42. The seat belt webbing 53 has a first end attached to the retractor unit 50 and a second end attached to the anchor 51. The seat belt webbing 53 also extends through the D-ring 54, which is attached to the seat belt height adjuster assembly 52. The vertical position of the D-ring 54 is adjustable by the seat belt height adjuster assembly 52 in a conventional manner. The seat belt tongue 55 is slidably mounted on the seat belt webbing 53 and is configured to engage a seat belt buckle (not shown) in a conventional manner. The seat belt assembly 20 is a conventional structure and thus, the seat belt assembly 20 will not be discussed in detail herein.

Turning now to FIGS. 7 to 16, the upper B-pillar section 18 will be discussed in more detail. As mentioned above, the upper B-pillar section 18 includes the interior body trim panel 30 and the back closure member 32. The interior body trim panel 30 and the back closure member 32 are preferably injection molded members. In this illustrated embodiment, the interior body trim panel 30 and the back closure member 32 are separate injection molded pieces that are preferably coupled together by a bond (diagrammatically illustrated in FIG. 9 by a series of dashed X's) to form an airtight connection (i.e., a sealed or airtight cross section). The bond between the interior body trim panel 30 and the back closure member 32 is formed by a sonic weld or an adhesive. Thus, the interior body trim panel 30 and the back closure member 32 are permanently bonded together to define the integrated HVAC duct 34 in which a first portion of the air passage of the integrated HVAC duct 34 is formed by the interior body trim panel 30 and a second portion of the air passage of the integrated HVAC duct 34 is formed by the back closure member 32.

In this illustrated embodiment, the integrated HVAC duct 34 has a first opening end 61 and a second opening end 62. The first opening end 61 mates with a lower open end 22a of the roof duct 22, while the second opening end 62 mates with an upper open end 16a of the lower sidewall duct 16. Preferably, the integrated HVAC duct 34 fits partially within the lower open end 22a of the roof duct 22 (see, FIG. 5), while a section of the upper open end 16a of the lower sidewall duct 16 fits partially within the second opening end 62 of the integrated HVAC duct 34. In other words, preferably, the first opening end 61 has a reduced cross sectional area that is perpendicular to a center longitudinal axis A of the integrated HVAC duct 34 as compared to a middle section of the integrated HVAC duct 34 and as compared to the second opening end 62 of the integrated HVAC duct 34. Thus, the integrated HVAC duct 34 extends between the lower sidewall duct 16 and the roof duct 22.

Figure 10:
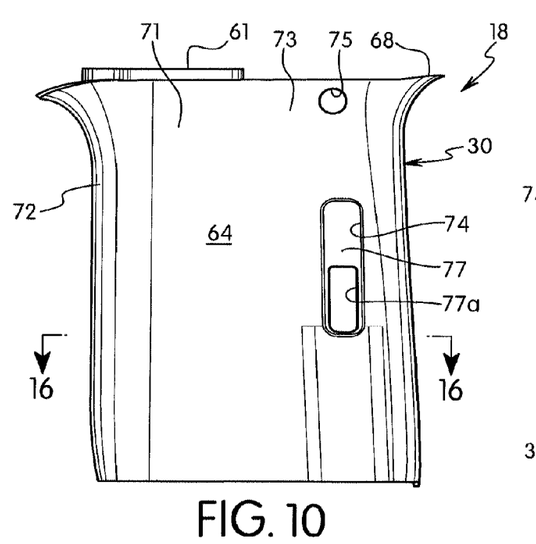
FIG. 10 is an inboard side elevational view of the portion of the interior body trim arrangement with the integrated HVAC duct illustrated in FIGS. 7 to 9.
Figure 11:
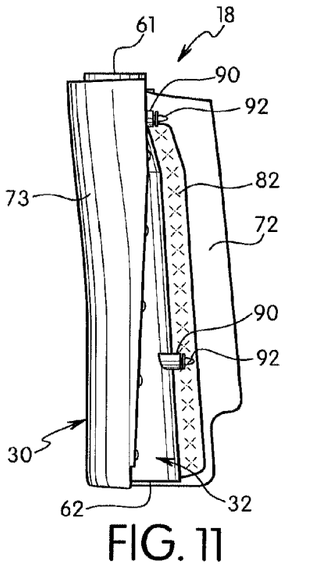
FIG. 11 is a forward facing side elevational view of the portion of the interior body trim arrangement with the integrated HVAC duct illustrated in FIGS. 7 to 10.
Figure 12:
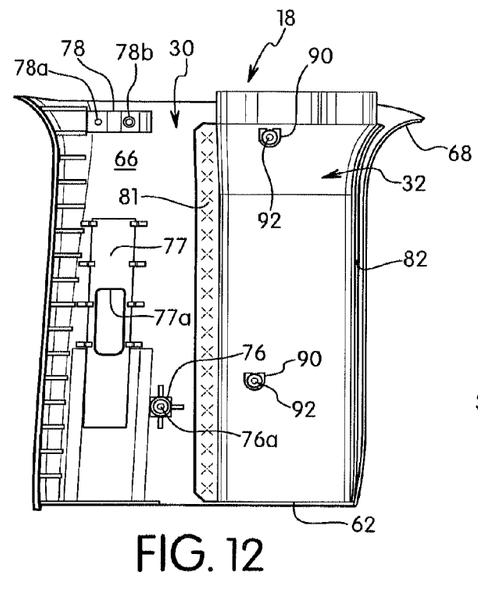
FIG. 12 is an outboard side elevational view of the portion of the interior body trim arrangement with the integrated HVAC duct illustrated in FIGS. 7 to 11.
Figure 13:
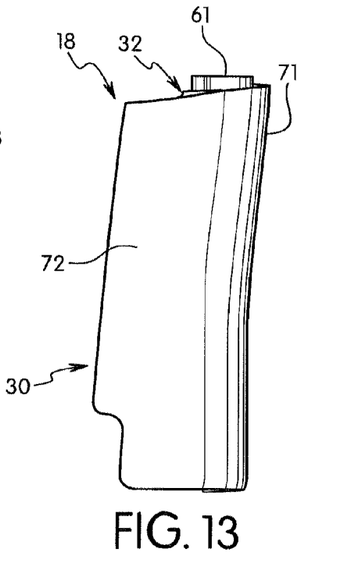
FIG. 13 is a rearward facing side elevational view of the portion of the interior body trim arrangement with the integrated HVAC duct illustrated in FIGS. 7 to 12.
Figure 14:
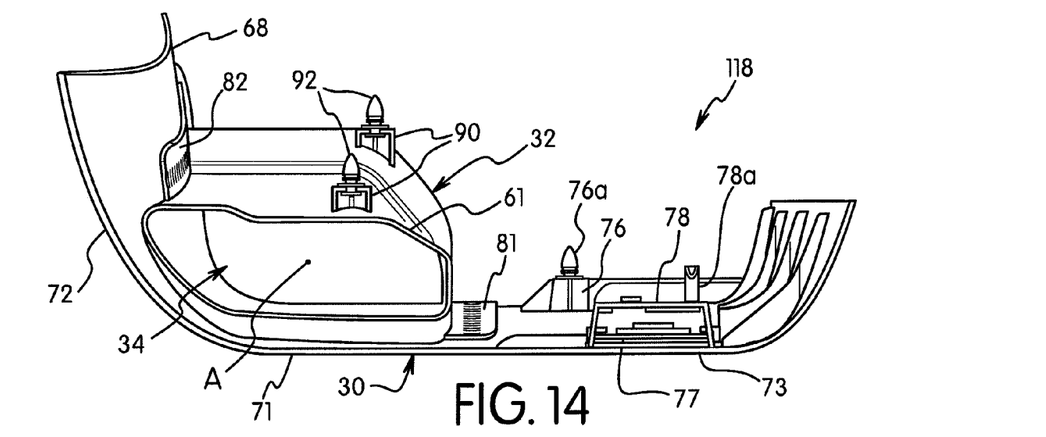
FIG. 14 is a top plan view of the portion of the interior body trim arrangement with the integrated HVAC duct illustrated in FIGS. 7 to 13.
Figure 15:
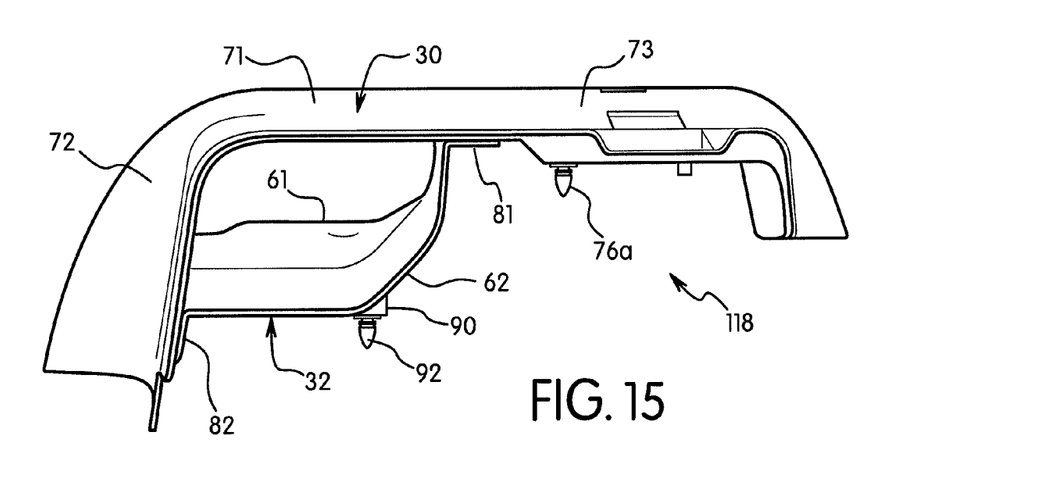
FIG. 15 is a bottom plan view of the portion of the interior body trim arrangement with the integrated HVAC duct illustrated in FIGS. 7 to 14.
Figure 16:
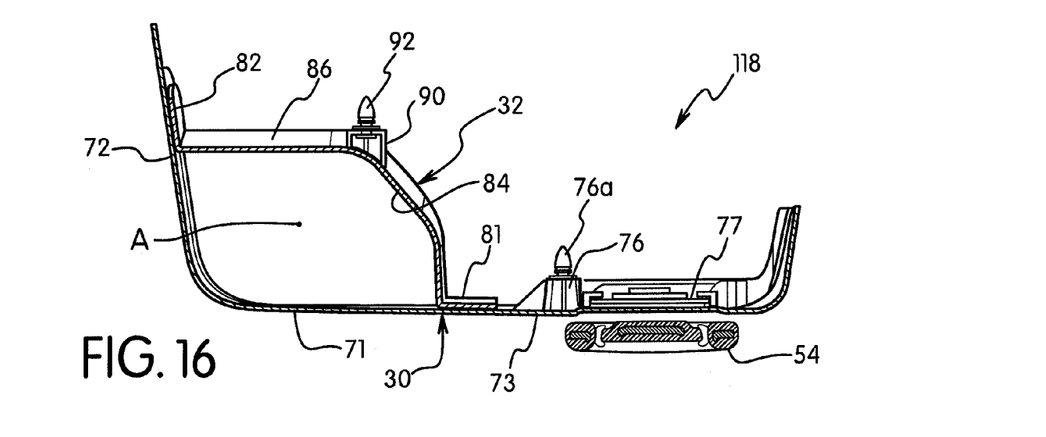
FIG. 16 is a horizontal cross sectional view of the portion of the interior body trim arrangement as viewed along section line 16-16 in FIG. 10.

As best seen in FIGS. 10 and 12, the interior body trim panel 30 has an interior facing surface 64 and an outboard facing surface 66 that is opposite the interior facing surface 64. A peripheral edge 68 of the interior body trim panel 30 is formed between the surfaces 64 and 66 of the interior body trim panel 30. The interior facing surface 64 mates with the interior facing surfaces of the lower sidewall section 14 to form a relatively smooth interior cabin surface therebetween without an abrupt transition between the interior facing surface 64 and the interior facing surface of the lower sidewall section 14. The interior body trim panel 30 is preferably a one-piece, unitary member that can be essentially divided into several sections. Alternatively, the interior body trim panel 30 can be formed of several individual pieces that are fixed together as an integrated part.

Preferably, the interior body trim panel 30 includes a first duct section 71, a second duct section 72, and a B-pillar section 73. The second duct section 72 is angularly arranged in a non-coplanar manner with respect to the first duct section 71 to define a vertically oriented corner of the integrated HVAC duct 34. The B-pillar section 73 extends from the first duct section 71. The first and second duct sections 71 and 72 and the B-pillar section 73 are vertically oriented when the interior body trim arrangement 12 is installed.

The B-pillar section 73 has a vertically extending seatbelt attachment slot or opening 74, a hole 75 and a dog house 76. A portion of the seat belt height adjuster assembly 52 with the D-ring 54 extends through the opening 74 in the B-pillar section 73. The seatbelt attachment opening 74 is formed in a central area between upper and lower edges of the interior body trim panel 30, and offset laterally with respect to the integrated HVAC duct 34 such that the seatbelt attachment opening 74 does not extend into the integrated HVAC duct 34. The seatbelt attachment opening 74 in the B-pillar section 73 is dimensioned to accommodate vertical movement of the D-ring 54. Preferably, a sliding cover 77 is slidably attached to the outboard facing surface 66 of the B-pillar section 73. This sliding cover 77 has an opening 77a in which the portion of the seat belt height adjuster assembly 52 with the D-ring 54 extends therethrough.

The dog house 76 is formed on the outboard facing surface 66 of the B-pillar section 73. Preferably, the dog house 76 is integrally molded with the B-pillar section 73. A fastener or trim clip 76a is attached to the dog house 76. The trim clip 76a is a push clip that is press-fitted into a hole in the side body inner panel 42 that partially formed the driver side B-pillar 38 as seen in FIG. 4. The dog house 76 in conjunction with the trim clip 76a constitute a pillar attachment structure that is disposed laterally from a center longitudinal axis A of the integrated HVAC duct 34 such that the driver side B-pillar 38 (e.g., a vehicle pillar) extends in a side by side relationship with the integrated HVAC duct 34 as seen in FIG. 4, when the interior body trim arrangement 12 is attached to the driver side B-pillar 38.

The outboard facing surface 66 of the B-pillar section 73 also includes a bracket 78 integrally molded with the B-pillar section 73. The bracket 78 has an alignment pin 78a that is inserted into a hole in the side body inner panel 42 that partially formed the driver side B-pillar 38. The bracket 78 also has an opening 78b that aligns with the hole 75 of the B-pillar section 73 such that the bracket 78 can be secured to the side body inner panel 42 that partially formed the driver side B-pillar 38 via a fastener or push clip (not shown) as needed and/or desired.

Figure 9:
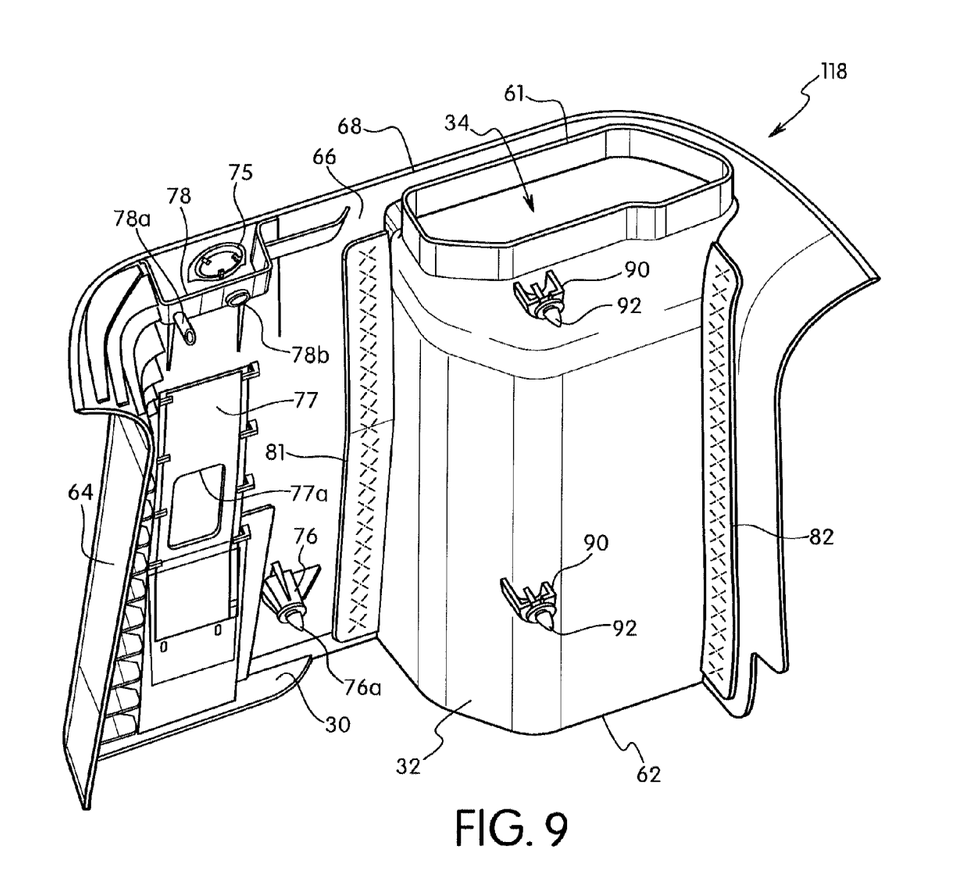
FIG. 9 is an outboard side perspective view of the portion of the interior body trim arrangement with the integrated HVAC duct illustrated in FIGS. 7 and 8.

Turning now to FIGS. 7, 9 and 12, the back closure member 32 of the upper B-pillar section 18 will be discussed in more detail. The back closure member 32 is fixed to the outboard facing surface 66 of the interior body trim panel 30. In particular, the back closure member 32 has two lateral attachment flanges 81 and 82 that constitute first and second edge connections of the back closure member 32. The attachment flanges 81 and 82 are bonded (e.g., sonic welded or adhesively attached) to the outboard facing surface 66 of the interior body trim panel 30. The attachment flanges 81 and 82 extend in a longitudinal direction (i.e., extend generally parallel to the center longitudinal axis A) of the integrated HVAC duct 34. The attachment flanges 81 and 82 are vertically oriented when the interior body trim arrangement 12 is installed, with the first attachment edge or flange 81 being secured to the outboard facing surface 66 of the interior body trim panel 30 at the first duct section 71 and the second attachment edge or flange 82 being secured to the outboard facing surface 66 of the interior body trim panel 30 at the second duct section 72. Preferably, the B-pillar section 73 extends from the first duct section 71 such that the first attachment edge or flange 81 is connected to a central area of the interior body trim panel 30 as measured in a horizontal direction between the vertically oriented corner of the integrated HVAC duct 34 and a vertically oriented free edge of the B-pillar section 73.

The back closure member 32 has an inboard side surface 84 and an outboard side surface 86 that is opposite the inboard side surface 84. A peripheral edge 88 of the back closure member 32 is formed between the surfaces 84 and 86 of the back closure member 32. The inboard side surface 84 of the back closure member 32 and the outboard side surface 66 of the interior body trim panel 30 define the interior air passage of the integrated HVAC duct 34. The outboard side surface 86 of the back closure member 32 also includes two dog houses 90 integrally molded with the back closure member 32. A vehicle body fastening clip 92 is attached to each of the dog houses 90. The trim clips 92 are push clip that are press-fitted into corresponding holes in the side body inner panel 42 at locations rearward of the driver side B-pillar 38. The dog houses 90 in conjunction with the trim clips 92 constitute a vehicle body attachment structure of the integrated HVAC duct 34.

Now one possible installation process of installing the interior body trim arrangement 12 to the vehicle 10 will be briefly discussed. Of course, it will be apparent to those skilled in the art from this disclosure that other installation processes are possible. The seat belt height adjuster assembly 52 needs to be attached to the B-pillar 38 of the side body inner panel 42 before the upper B-pillar section 18 is attached to the side body inner panel 42. Then, the roof duct 22 is fastened to the roof body inner panel by fasteners. Next, the head liner 24 is fastened to the roof body inner panel by several conventional trim clips (not shown) in a conventional manner.

Now, the upper B-pillar section 18 is ready to be attached to the side body inner panel 42. This is accomplished by first inserting the first opening end 61 of the integrated HVAC duct 34 into the lower open end 22a of the roof duct 22. During this process of connecting the integrated HVAC duct 34 to the roof duct 22, the trim clips 76a and 92 are pushed into holes of the side body inner panel 42 to secure the upper B-pillar section 18 to the side body inner panel 42. When the upper B-pillar section 18 is secured to the side body inner panel 42 by the trim clips 76a and 92, an adjustment knob 52a of the seat belt height adjuster assembly 52 will project through the seatbelt attachment opening 74 in the B-pillar section 73. Now the D-ring 54 can be attached to the seat belt height adjuster assembly 52.

Next, the lower sidewall duct 16 and the lower sidewall section 14 are installed. The lower sidewall duct 16 is coupled to the second opening end 62 of the integrated HVAC duct 34 after the upper B-pillar section 18 is installed to the vehicle 10. In particular, the upper open end 16a of the lower sidewall duct 16 and the second opening end 62 of the integrated HVAC duct 34 are matingly configured such that the upper open end 16a of the lower sidewall duct 16 is movable in a vertical direction for connection (e.g., insertion) to the second opening end 62 of the integrated HVAC duct 34 prior to complete installation of the lower sidewall duct 16 to the vehicle 10. The lower sidewall duct 16 is then secured to the side body inner panel 42 by the fasteners 44. To provide an air tight connection between the upper open end 16a of the lower sidewall duct 16 and the second opening end 62 of the integrated HVAC duct 34, the upper open end 16a of the lower sidewall duct 16 can be provided with an annular gasket as seen in broken lines in FIG. 3. The lower open end of the lower sidewall duct 16 is connected to the blower of the HVAC unit 36.

Figure 17:
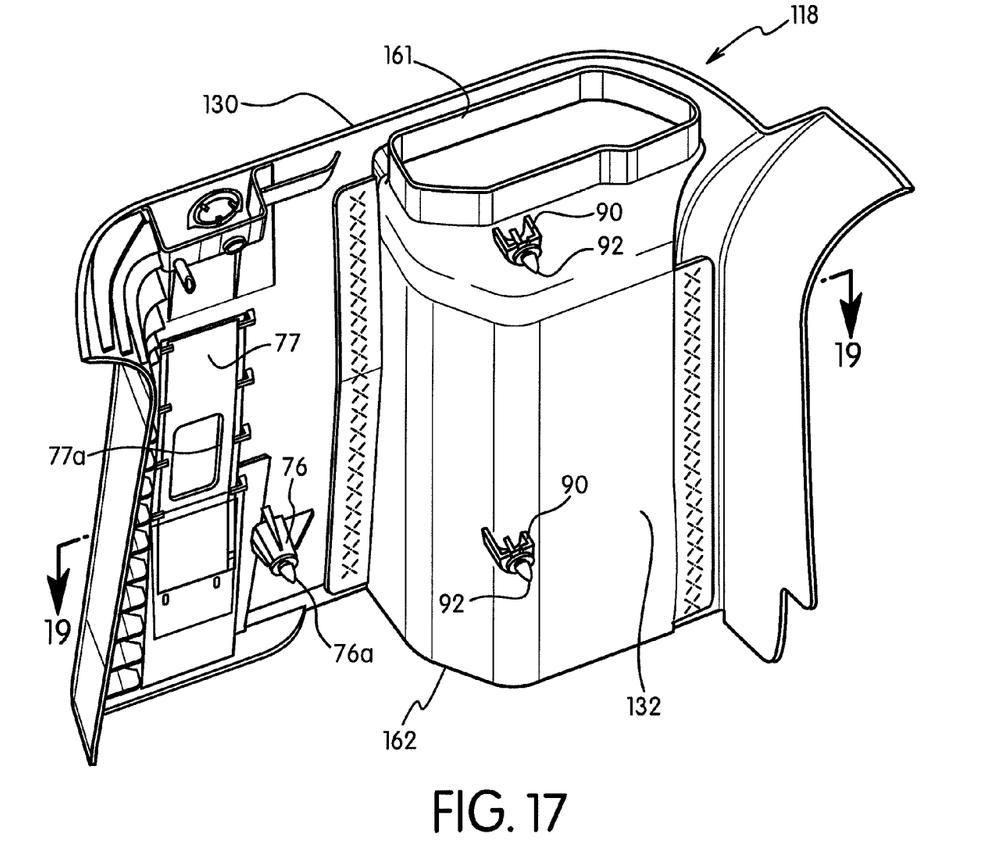
FIG. 17 is an outboard side perspective view of a portion of an interior body trim arrangement with an integrated HVAC duct in accordance with a second embodiment.
Figure 18:
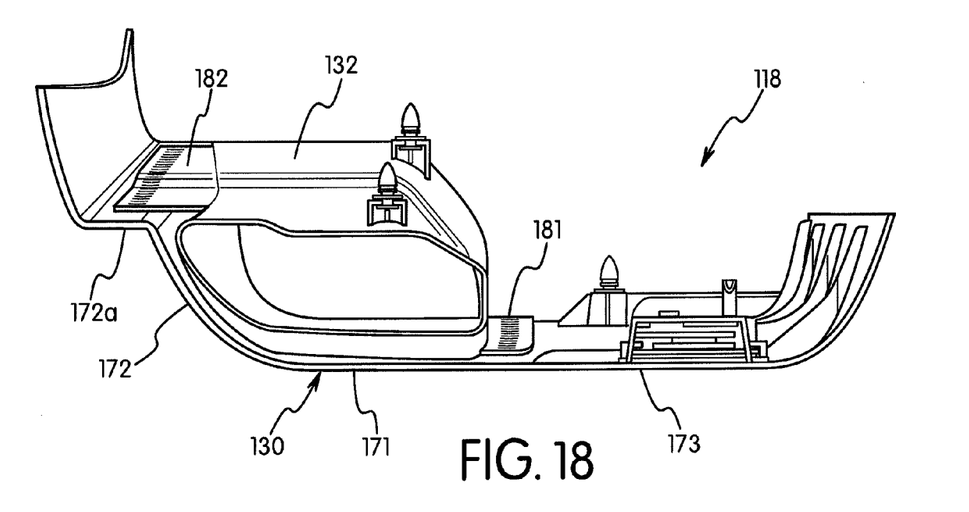
FIG. 18 is a top plan view of the portion of the interior body trim arrangement with the integrated HVAC duct illustrated in FIG. 17.
Figure 19:
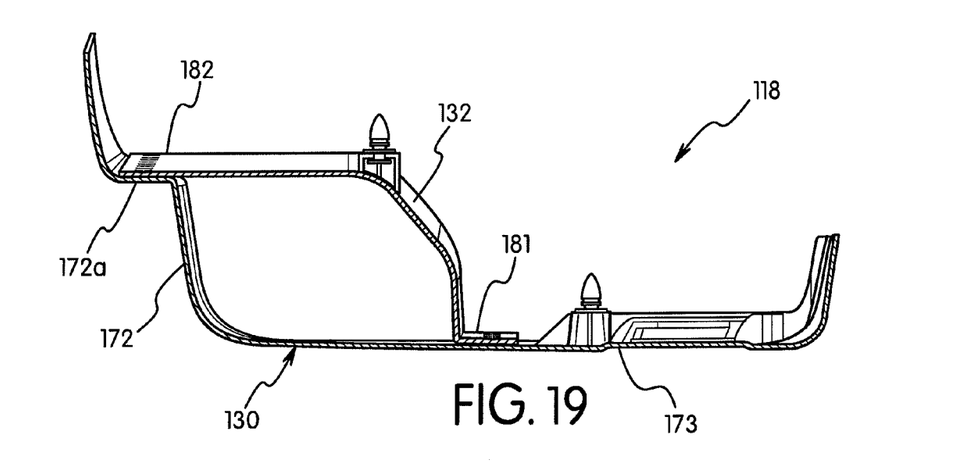
FIG. 19 is a horizontal cross sectional view of the portion of the interior body trim arrangement as viewed along section line 19-19 in FIG. 17.

Referring now to FIGS. 17 to 19, an upper B-pillar section 118 interior body trim arrangement 112 in accordance with a second embodiment will now be explained. The upper B-pillar section 118 replaces the upper B-pillar section 18 in the interior body trim arrangement 112 discussed above in accordance with a first embodiment. The upper B-pillar section 118 basically includes an interior body trim panel 130 and a back closure member 132. The upper B-pillar section 118 is identical to the upper B-pillar section 18 of the first embodiment, except that shapes of the body trim panel 130 and the back closure member 132 have been changed so that a single (i.e., one-step) vibration weld process can be used to bond the body trim panel 130 and the back closure member 132 together. In view of the similarity between the first and second embodiments, the descriptions of the parts of the second embodiment that are identical to the parts of the first embodiment will be omitted for the sake of brevity.

In this illustrated embodiment, the interior body trim panel 130 and the back closure member 132 are separate pieces that are preferably coupled together by a bond (diagrammatically illustrated in FIG. 17 by a series of dashed X's) to form an airtight connection. The bond between the interior body trim panel 130 and the back closure member 132 is formed by a sonic weld or an adhesive. Thus, the interior body trim panel 130 and the back closure member 132 are permanently bonded together to define an integrated HVAC duct 134. In this illustrated embodiment, the integrated HVAC duct 134 has a first opening end 161 and a second opening end 162. The first opening end 161 mates with the lower open end 22a of the roof duct 22, while the second opening end 162 mates with an upper open end 16a of the lower sidewall duct 16, similar to the first embodiment.

Preferably, the interior body trim panel 130 includes a first duct section 171, a second duct section 172, and a B-pillar section 173. The second duct section 172 is angularly arranged in a non-coplanar manner with respect to the first duct section 171 to define a vertically oriented corner of the integrated HVAC duct 134. The first and second duct sections 171 and 172 and the B-pillar section 173 are the same as the first and second duct sections 71 and 72 and the B-pillar section 73, except that the second duct section 172 has a step portion 172a for attaching the back closure member 132. In particular, the back closure member 132 has two lateral attachment flanges 181 and 182 that constitute first and second edge connections of the back closure member 132. In this second embodiment, the first and second attachment flanges 181 and 182 extend substantially parallel to one another, with the second attachment flange 182 being attached to the step portion 172a of the second duct section 172 of the interior body trim panel 130. This parallel arrangement of the first and second attachment flanges 181 and 182 allows for a single vibration weld process to be used to simultaneously bond the first and second attachment flanges 181 and 182 to the first and second duct sections 171 and 172, respectively using sonic welding.

With the upper B-pillar sections 18 and 118, an integrated HVAC duct is formed with an interior body trim panel so that a separated mounting bracket for the interior body trim panel and the HAVC duct is no longer needed because the upper B-pillar section can now be mounted to the body sheet metal directly. All dog houses for trim clips are molded on (integrated to) the outboard side of the back closure member or the outboard side of the interior body trim panel. Thus, no secondary operations are required to add dog houses. The upper B-pillar sections 18 and 118 can also provided better fit and finish control due to less stack up and variance, and provide a cleaner design because less surface transitions are required. The upper B-pillar sections 18 and 118 are also very suited for mass production.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a vehicle equipped with the interior body trim arrangement. Accordingly, these terms, as utilized to describe the present invention should be interpreted relative to a vehicle equipped with the interior body trim arrangement. The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Also while the upper B-pillar sections are applied to the side trim adjacent a B-pillar, it will be apparent to those skilled in the art from this disclosure that the interior body trim panel and the back closure member can be configured so as to be applied to any interior body side trim with HVAC duct running behind it. While the back closure member is illustrated as being bonded to the interior body trim panel by sonic weld or an adhesive, it will be apparent to those skilled in the art from this disclosure that they can also be attached to by screw fixing, heat stake or other attachment structures with an additional foam sealing operation added as a secondary operation for forming an airtight connection. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

LIST OF REFERENCE NUMERALS FOR FIRST EMBODIMENT

10—vehicle
12—interior body trim arrangement
14—lower sidewall section
16—lower sidewall duct
16a—upper open end
18—upper B-pillar section
20—seat belt assembly
22—roof duct
22a—lower open end
24—head liner
30—interior body trim panel
32—back closure member
34—integrated HVAC duct
36—HVAC unit
38—driver side B-pillar
42—side body inner panel
50—retractor unit
51—anchor
52—seat belt height adjuster assembly
53—seat belt webbing
54—D-ring
55—seat belt tongue
61—first opening end
62 second opening end
64—interior facing surface
66—outboard facing surface
68—peripheral edge
71—first duct section
72—second duct section
73—B-pillar section
74—seatbelt attachment slot or opening
75—hole
76—dog house
77—sliding cover
77a—opening
76a—fastener or trim clip
78—bracket
78a—alignment pin
78b—opening
81—attachment flange
82—attachment flange
84—inboard side surface
86—outboard side surface
88—peripheral edge 88
90—dog houses
92—vehicle body fastening clip

What is claimed is:

1. An interior body trim arrangement comprising:
an interior body trim panel having an interior facing surface and an outboard facing surface opposite the interior facing surface; and
a back closure member fixed to the outboard facing surface of the interior body trim panel with an inboard facing surface of the back closure member and the outboard facing surface of the interior body trim panel defining an integrated HVAC duct having a first opening end and a second opening end, the back closure member being independently formed as a separate piece from the interior body trim panel, the back closure member including a duct interface with a first peripheral end edge, the duct interface defining the first opening end of the integrated HVAC duct, the first peripheral end edge of the duct interface being spaced apart from the outboard facing surface of the interior body trim panel, an edge portion of the back closure member at the second opening end and an edge portion of the interior body trim panel at the second opening end forming a second peripheral end edge of the integrated HVAC duct.

2. The interior body trim arrangement according to claim 1, wherein
the first opening end has a reduced cross sectional area that is perpendicular to a center longitudinal axis of the integrated HVAC duct as compared to a middle section of the integrated HVAC duct.

3. The interior body trim arrangement according to claim 1, wherein
the first opening end has a reduced cross sectional area that is perpendicular to a center longitudinal axis of the integrated HVAC duct as compared to the second opening end of the integrated HVAC duct.

4. The interior body trim arrangement according to claim 1, wherein
the back closure member has an outboard side surface with at least one vehicle body fastening clip disposed thereon, the vehicle body fastening clip being configured to fixedly couple the interior body trim arrangement to a vehicle body structure of a vehicle.

5. The interior body trim arrangement according to claim 1, wherein
the outboard facing surface of the interior body trim panel has a pillar attachment structure disposed laterally from a center longitudinal axis of the integrated HVAC duct such that a vehicle pillar extends in a side by side relationship with the integrated HVAC duct when the interior body trim arrangement is attached to the vehicle pillar.

6. The interior body trim arrangement according to claim 1, wherein
the back closure member has a pair of edge connections bonded to the outboard facing surface of the interior body trim panel, with the edge connections extending in a longitudinal direction of the integrated HVAC duct.

7. The interior body trim arrangement according to claim 1, wherein
the interior body trim panel and the back closure member are separate pieces that are coupled together by a bond.

8. The interior body trim arrangement according to claim 1, wherein
the interior body trim panel includes a B-pillar section extending from the integrated HVAC duct.

9. The interior body trim arrangement according to claim 1, wherein
the integrated HVAC duct extends between a lower sidewall duct and a roof duct.

10. The interior body trim arrangement according to claim 1, wherein
the interior body trim panel includes a seatbelt attachment opening for attaching a seatbelt.

11. The interior body trim arrangement according to claim 10, wherein the seatbelt attachment opening is formed in a central area between upper and lower edges of the interior body trim panel, and offset laterally with respect to the integrated HVAC duct such that the seatbelt attachment opening does not extend into the integrated HVAC duct.

12. The interior body trim arrangement according to claim 1, wherein
the interior body trim panel has first and second duct sections that are vertically oriented when the interior body trim arrangement is installed, with the second duct section being angularly arranged in a non-coplanar manner with respect to the first duct section to define a vertically oriented corner of the integrated HVAC duct.

13. The interior body trim arrangement according to claim 12, wherein
the back closure member includes first and second edge connections that are vertically oriented when the interior body trim arrangement is installed, with the first edge connection being secured to the outboard facing surface of the interior body trim panel at the first duct section and the second edge connection being secured to the outboard facing surface of the interior body trim panel at the second duct section.

14. The interior body trim arrangement according to claim 13, wherein
the interior body trim panel further includes a B-pillar section extending from the first duct section such that the first edge connection is connected to a central area of the interior body trim panel as measured in a horizontal direction between the vertically oriented corner of the integrated HVAC duct and a vertically oriented free edge of the B-pillar section.

15. The interior body trim arrangement according to claim 13, wherein the second edge connection is attached to a step portion of the second duct section of the interior body trim panel.

16. The interior body trim arrangement according to claim 15, wherein the back closure member includes first and second attachment flanges, with the first attachment flange forming the first edge connection and the second attachment flange forming the second edge connection, and with the first and second attachment flanges extending substantially parallel to one another.

17. The interior body trim arrangement according to claim 1, further comprising
a lower duct coupled to the second opening end of the integrated HVAC duct when the interior body trim arrangement is installed to a vehicle, with the lower duct and the second opening end of the integrated HVAC duct being matingly configured such that the lower duct is movable in a longitudinal direction of the integrated HVAC duct for connection to the second opening end of the integrated HVAC duct prior to installation of the lower duct to the vehicle.

18. The interior body trim arrangement according to claim 1, wherein
the interior body trim panel includes a U-shaped component with first and second interior corners, and
the back closure member includes an L-shaped component that mates with the interior body trim panel to define the integrated HVAC duct at one of the first and second interior corners.

19. The interior body trim arrangement according to claim 1, wherein
the interior facing surface of the interior body trim panel continuously extends along the integrated HVAC duct.

20. A vehicle comprising:
a vehicle body structure having a structural pillar that defines a passenger compartment of the vehicle;
an interior body trim panel fixed to the vehicle body structure, the interior body trim panel having an interior facing surface and an outboard facing surface opposite the interior facing surface, the outboard facing surface of the interior body trim panel defining a cavity when the interior body trim panel is installed to the vehicle body structure; and
a back closure member fixed to the outboard facing surface of the interior body trim panel, the back closure member spanning a portion of the outboard facing surface of the interior body trim panel such that the back closure member divides the cavity into a duct portion that is configured to direct airflow to the passenger compartment of the vehicle and a pillar portion that is configured to receive the structural pillar of the vehicle body structure when the interior body trim panel is installed to the vehicle body structure.

* * * * *